United States Patent [19]
Keyworth et al.

[11] Patent Number: 6,134,359
[45] Date of Patent: Oct. 17, 2000

[54] OPTICAL MULTIPLEXING/ DEMULTIPLEXING DEVICE HAVING A WAVELENGTH DISPERSIVE ELEMENT

[75] Inventors: Barrie Keyworth, Ottawa; Kent R. Lundgren, Nepean, both of Canada

[73] Assignee: JDS Uniphase Inc., Ottawa, Canada

[21] Appl. No.: 08/977,396

[22] Filed: Nov. 24, 1997

[51] Int. Cl.[7] .................................................... G02B 6/32
[52] U.S. Cl. ............................. 385/33; 385/25; 385/37; 385/119
[58] Field of Search ............................... 385/33, 35, 34, 385/25, 22, 47, 37, 36, 119

[56] References Cited

U.S. PATENT DOCUMENTS 4,626,066 12/1986 Levinson .............................. 350/96.18
5,305,402 4/1994 Hill et al. .............................. 385/25

Primary Examiner—Hung N. Ngo
Attorney, Agent, or Firm—Neil Teitelbaum

[57] ABSTRACT

A method and device for optical multiplexing or demultiplexing of optical signals. The device has a grating for dispersing an input beam into a plurality of sub-beams which are focused by a simple lens and a GRIN lens on a glass block having a plurality of waveguides embedded therein with a predetermined spacing therebetween. In order to correct for an offset in alignment, e.g. due to ambient temperature changes, between the sub-beams and the waveguides of the block, the latter is mounted to a thermally activated actuator for an controlled angular displacement which is selected to compensate for the offset.

11 Claims, 2 Drawing Sheets

OPTICAL MULTIPLEXING/ DEMULTIPLEXING DEVICE HAVING A WAVELENGTH DISPERSIVE ELEMENT

FIELD OF THE INVENTION

This invention relates generally to an device for multiplexing and/or demultiplexing optical signals, and particularly such device having a wavelength dispersive element to separate an input beam into a plurality of sub-beams having differing wavelengths.

BACKGROUND OF THE INVENTION

In wavelength division multiplexed optical communication systems, many different optical wavelength carriers provide independent communication channels in a single optical fiber. Future computation and communication systems place ever-increasing demands upon communication link bandwidth. It is generally known that optical fibers offer much higher bandwidth than conventional coaxial communications; furthermore a single optical channel in a fiber waveguide uses a microscopically small fraction of the available bandwidth of the fiber (typically a few GHz out of several tens of THz). By transmitting several channels at different optical wavelengths into a fiber (i.e., wavelength division multiplexing, or WDM), this bandwidth may be more efficiently utilized.

There have been many attempts to develop a compact, high-resolution waveguide demultiplexor or spectrometer for application in areas such as spectroscopy, optical networks and optical links and more particularly optical communication systems. Such a demultiplexor can be extremely critical in WDM links. In these links or networks, each channel is assigned a distinct and unique wavelength for data transmission. Thus, the optical fiber that connects channels in a WDM network carries many discrete wavelength channels and a particular wavelength is selected before the data is received. The data reception can be achieved by combining a wavelength demultiplexor, photo-detectors and electronic selection circuitries. In WDM links, many wavelengths are multiplexed and transmitted through a single optical fiber to increase the capacity of the fiber. The receiver must demultiplex the many wavelengths and select the proper channel for reception. In these applications, the requirements on the wavelength demultiplexor are typically: an optical bandwidth >30 nm, a wavelength resolution of a few angstroms, polarization insensitivity, compactness, low loss, low crosstalk, and a low manufacturing cost.

At present, there are many known methods of selecting particular wavelengths, however, none are ideal for the applications outlined above.

Techniques for multiplexing and demultiplexing between a single optical fiber comprising the multiplexed channel and plural optical fibers comprising the plural demultiplexed channels are described in various U.S. patents. For example, multiplexing/demultiplexing with birefringent elements is disclosed in U.S. Pat. Nos. 4,744,075 and 4,745,991. Multiplexing/demultiplexing using optical bandpass filters (such as a resonant cavity) is disclosed in U.S. Pat. Nos. 4,707,064 and 5,111,519. Multiplexing/demultiplexing with interference filters is disclosed in U.S. Pat. Nos. 4,474,424 and 4,630,255 and 4,735,478. Multiplexing/demultiplexing using a prism is disclosed in U.S. Pat. No. 4,335,933. U.S. Pat. No. 4,740,951 teaches a complex sequence of cascaded gratings to demultiplex plural optical signals. U.S. Pat. Nos. 4,756,587 and 4,989,937 and 4,690,489 disclose optical coupling between adjacent waveguides to achieve a demultiplexing function. A similar technique is disclosed in U.S. Pat. No. 4,900,118. Although some of these techniques are better than others, there is a need for a system using grating elements, or generally wavelength-dispersive elements, that is relatively inexpensive to manufacture and that provides reasonable precision.

Wavelength-dispersive optical elements such as diffraction gratings, for example an echellette grating, have been known for many years to produce a high-resolution spectrum where the wavelength is a function of the diffracted angle. Such a single grating can demultiplex many wavelengths. When an incident beam comprising a plurality of wavelengths of light is incident upon a diffraction grating, the light is diffracted by the grating and is separated into sub-beams that can be focused by a lens and received by a plurality of waveguides or detectors. However, providing a grating system wherein an array of optical waveguides is precisely positioned a predetermined distance from the focusing lens to capture adjacent spaced wavelength channels, is not without some difficulties.

The array of optical waveguides must be spaced precisely having a predetermined spacing in order to capture light of a particular set of wavelengths (channels). This spacing corresponds to the spacing of the sub-beams, which are produced by the diffraction grating and focused by the focusing lens, and is determined by the line density of the diffraction grating and the focal length of the focusing lens. If the spacing between adjacent waveguides is too large or too small, waveguides designed to couple with and receive particular wavelengths may couple with other wavelengths or may not couple with an intended wavelength efficiently.

Typically, lenses used in commercial applications have a focal-length tolerance of approximately ±2% or greater. The cost of using focusing lenses that are within a smaller tolerance, for example guaranteed to be within ±1%, adds significantly to the cost of the manufactured device that some customers are not willing to pay. However, it is also impractical to manufacture waveguide arrays such that each array has unique waveguide spacing designed to match the beam spacing produced by a particular lens.

Furthermore, to efficiently couple light, the waveguide must be at an optimum distance from the focusing lens, which is determined by the focal length of the lens.

These difficulties can be addressed by incorporating an imaging lens which provides transverse magnification to correct the mismatch between the sub-beam spacing and the waveguide spacing and also provides a convenient point of attachment for the waveguide array and a means to position the array at the optimal distance from the focusing lens. This is described in greater detail in copending U.S. patent application Ser. No. 08/924,656 incorporated herein by reference, assigned to JDS Fitel Inc. Canada, the assignee of this instant application. For example, if the focal length of the focusing lens is larger than the design value, then the sub-beams will be spaced farther apart than the waveguides. Therefore, the imaging lens would be made to provide a transverse magnification less than 1 so that the beam spacing is reduced to match the waveguide spacing.

In a current design of a wavelength multiplexor/demultiplexor being manufactured by the assignee, JDS Fitel, Inc., the array of input/output waveguides is provided on a waveguide concentrator chip, or block, which is a monolithic slab of glass, having a pattern of waveguides disposed therein for coupling light from input/output optical fibers to a lens and onward to a grating element. Using such a concentrator chip has obvious advantages over using individual optical fibers for the coupling of light from one location to another. For example, obtaining a fixed and accurate spacing between adjacent waveguides becomes less complex, less expensive, and more reliable than using an array of optical fibers positioned and affixed at predetermined locations adjacent one another. However, since the pattern of waveguides on a monolithic device is fixed and cannot be altered after the device is manufactured, accurate alignment of input and output waveguides to the monolithic structure is critical. Furthermore, once the monolithic waveguide is positioned with respect to other components in the device, it is critical that alignment of all alignment sensitive components be maintained. Furthermore, in applications similar to the current application, where a monolithic device is being utilized with various other components whose relative position and performance may change with variations in temperature, thermal stabilization may be considered a requirement. However, thermal stabilization of the entire device, i.e. to maintain the temperature of all alignment sensitive components at a predetermined temperature, requires a substantial amount of power.

Aside from a substantial power requirement, a considerable amount of heat is dissipated throughout an entire system having several of these devices; this unwanted heat often exceeds certain customer requirements and affects other optical components.

It is an object of this invention to provide control of a monolithic waveguide device within an optical router, or a multiplexor/demultiplexor having a plurality of alignment sensitive components.

It is a further object of the invention to provide a means for controllably steering a beam of light.

It is a further object of the invention to provide a means of controllably steering a beam or a number of beams into a monolithic waveguide block in order to compensate for temperature dependent unwanted alignment changes in alignment sensitive components optically coupled with the waveguide block.

SUMMARY OF THE INVENTION

In accordance with the invention, there is provided a device for routing, or redirecting, optical signals, e.g. a demultiplexing or multiplexing device, having a wavelength dispersive element for separating an input beam into sub-beams of light in accordance with their wavelength;

a waveguide block having a plurality of waveguide means disposed therein for receiving at least some of said sub-beams, the waveguide block having a first end and a second end, wherein the plurality of waveguides extends between the first end and the second end;

a focusing lens disposed between the wavelength dispersive element and the first end, for focusing said sub-beams at substantially a predetermined distance from the wavelength dispersive element; and, means associated with the waveguide block for controllably moving the block such as to control the alignment of the sub-beams with the plurality of waveguides at the first end of the block.

In accordance with another aspect of the invention, there is provided a method of correcting for an offset in alignment in an optical routing device having a wavelength dispersive element for separating an input beam into sub-beams of light in accordance with their wavelength, a waveguide block having a first end and a second end and a plurality of waveguide means disposed in said block between said first end and said second end for receiving at least some of said sub-beams, and a focusing lens disposed between the wavelength dispersive element and the first end, for focusing said sub-beams at substantially a predetermined distance from the wavelength dispersive element, said method comprising providing an actuator associated with said block in a manner to effect a generally lateral displacement of said block when said actuator is activated, and controllably activating said actuator in response to said alignment offset such as to compensate for said offset.

BRIEF DESCRIPTION OF THE DRAWINGS

Exemplary embodiments of the invention will now be described in conjunction with the drawings in which.

DETAILED DESCRIPTION

Figure 1:
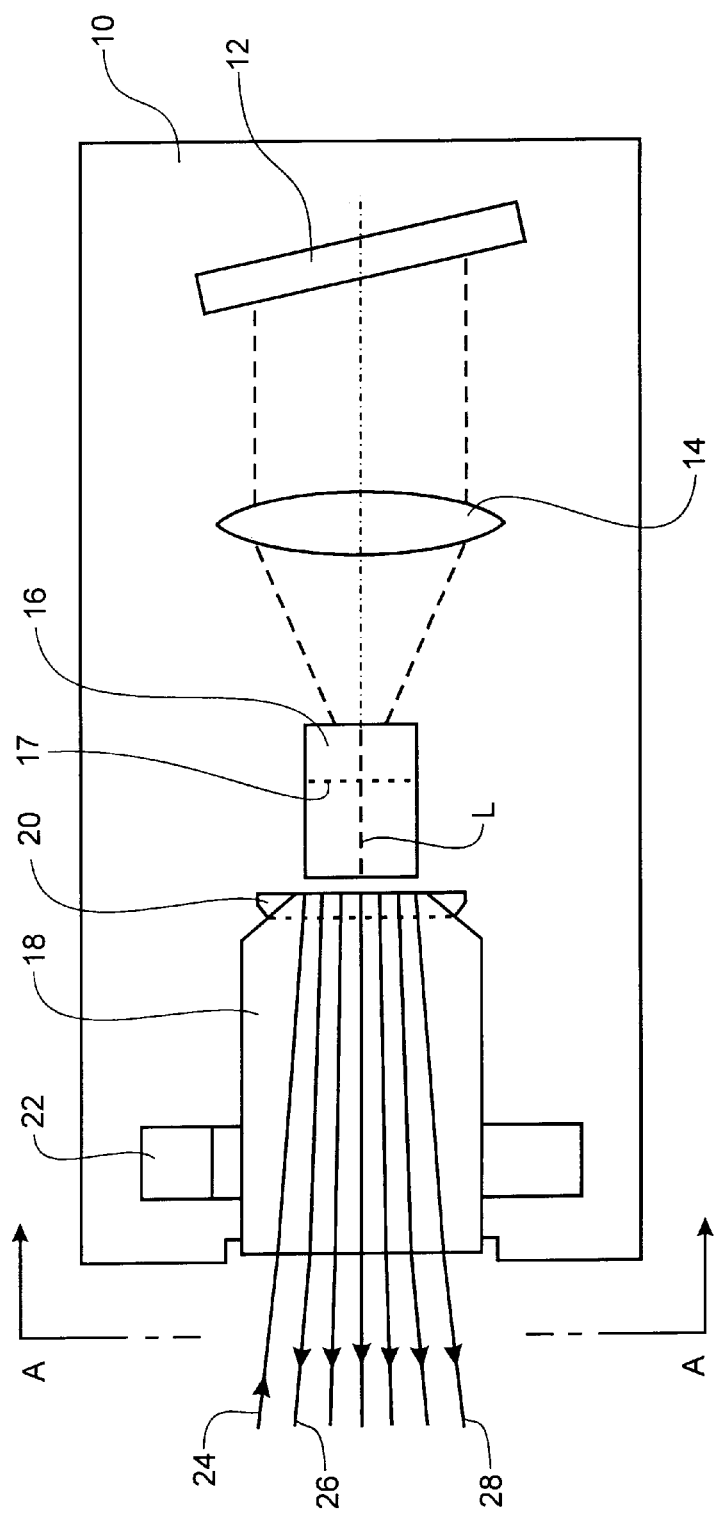
FIG. 1 is a top view (not to scale) of an optical device in accordance with the invention.

An exemplary embodiment of the device according to the invention is illustrated in FIG. 1 wherein 10 denotes a frame made advantageously of Invar or another suitable material, preferably one having a low coefficient of thermal expansion to minimize misalignments of the optical system due to ambient temperature variations. Mounted on the frame 10 are a diffraction grating element 12, a focusing lens 14 and a cylindrical graded index (GRIN) lens 16. The latter is selected and disposed such as to correct an offset in the focal length of the lens 14. The GRIN lens may actually be composed of two axially placed GRIN lenses which may be separated by an optical spacer 17. In the example illustrated, the lens 14 has an offset of +2% and the lens 16 is slightly shorter than a half-pitch 1:1 cylindrical GRIN lens to correct for the offset. Alternatively, but less preferably, an optically equivalent GRIN lens arrangement can be used wherein two back-to-back substantially quarter pitch GRIN lenses are coupled with their collimating ends such that a substantially 1:1 imaging is provided for an image or beam at an end of the lens. The lens 16 has an optical axis L which is colinear with the optical axis of the lens 14.

A glass concentrator block 18 is mounted adjacent the GRIN lens 16 and facing the lens with its first end which is attached to the frame 10 with an epoxy adhesive 20 or other suitable adhesive. Most epoxy adhesives are suitable for this purpose which will be explained in more detail below. The concentrator has a funnel-like shape wherein the waveguides at one end (first end) have a narrower spacing than at the distal, second end. This facilitates the attachment of fibers to the second end of the concentrator.

Figure 2:
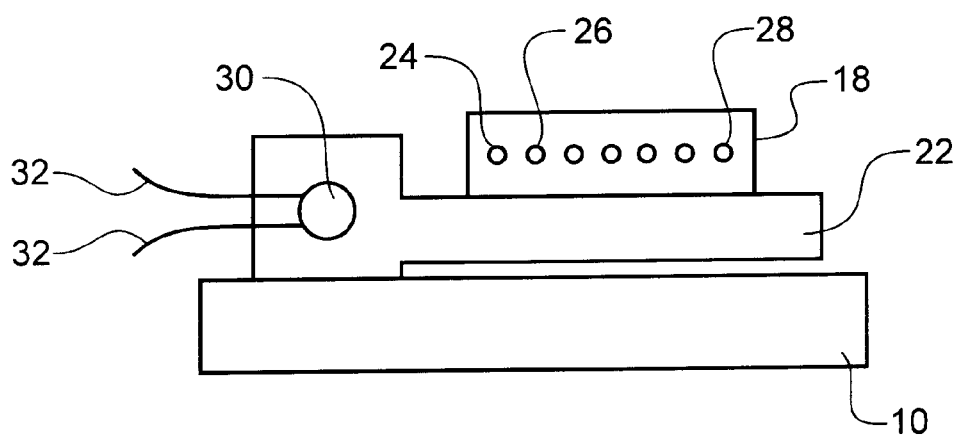
FIG. 2 is an A—A side view of the device of FIG. 1, showing a frame, an actuator and the waveguide block.

The distal (left-hand in the drawing), second end of the block 18 is fixed to a thermal compensator 22 the details of which are shown in FIG. 2. The concentrator block 18 has a number of waveguides therein, one of which is connected, with an optical adhesive, to an input optical fiber 24 while the others are connected by the optical adhesive to output fibers e.g. 26, 28.

As seen in FIG. 2, the concentrator 18 is fixed to the compensator 22 which has a resistive heating element 30 with two leads 32 to a power supply, not shown. The compensator is attached to the frame 10, wherein a part of the length of the compensator is not supported. This has the effect of the non-supported part expanding freely when heat is generated by the heating element 30. This in turn causes the second end of the block 18 to shift laterally (rightwise in FIG. 2). The adhesive attachment 20 is selected such as to enable a small displacement of the joint. As a result, the block 18 moves pivotally about the first end which is glued to the frame 10. The pivotal displacement is equivalent to an angular displacement of the concentrator 18 relative to the optical axes of the lens 14 or the GRIN lens 16.

The purpose of the design illustrated herein by way of example is to correct an offset in alignment between the sub-beams generated by the grating 12, lens 14 and GRIN lens 16 from an input (e.g. multiplexed) beam when passed into system through the input fiber 24.

Such offset, as explained above, may occur when a temperature change is experienced on various components of the device. To correct the offset, controlled heating is applied to the heating element 30. The actuator 22 expands, and the concentrator 18 moves pivotally by an angle typically less than 0.5 deg. As a result, the angle of the input beam (fiber 24) entering the lenses 16, 14 and incident on the grating 12 changes sufficiently to cause the return sub-beams to shift as well. The application of heat is controlled so that the sub-beams are aligned with the respective waveguides of the concentrator 18.

It is feasible to provide other actuating means for lateral displacement of the concentrator 18 than illustrated, with a view to adjusting the alignment of the sub-beams with the waveguides of the concentrator 18. It will also be noted that the input beam does not have to be passed through the concentrator, but rather from an independent source of light, whereby a lateral rather than an angular displacement of the concentrator 18 may be employed. In such a case, the adhesive attachment of the first end of the concentrator would not be necessary.

What is claimed is:

1. An optical routing device comprising:
   a wavelength dispersive element for separating an input beam into sub-beams of light in accordance with their wavelength;
   a waveguide block having a first end and a second end and a plurality of waveguide means disposed therein between said first end and said second end for receiving at least some of said sub-beams;
   a focusing lens disposed between the wavelength dispersive element and the first end, for focusing said sub-beams at substantially a predetermined distance from the wavelength dispersive element; and,
   an actuator means associated with the waveguide block for controllably moving an end of the waveguide block such as to control the alignment of the sub-beams with the plurality of waveguides at the first end of the block, wherein said actuator means for controllably moving said block comprises a thermally expansive element and an associated heat source for controllably heating said element, and wherein said device is an optical multiplexor, and, or an optical demultiplexor.

2. An optical routing device comprising:
   a wavelength dispersive element for separating an input beam into sub-beams of light in accordance with their wavelength;
   a waveguide block having a first end and a second end and a plurality of waveguide means disposed therein between said first end and said second end for receiving at least some of said sub-beams;
   a focusing lens disposed between the wavelength dispersive element and the first end, for focusing said sub-beams at substantially a predetermined distance from the wavelength dispersive element;
   an actuator means associated with the waveguide block for controllably moving an end of the waveguide block such as to control the alignment of the sub-beams with the plurality of waveguides at the first end of the block; and
   a frame, wherein said first end of said block is flexibly attached to said frame and said actuator means is connected to said block in a manner enabling said block to be moved pivotably relative to said first end, wherein said plurality of waveguides includes a waveguide for receiving the input beam, and wherein said device is an optical multiplexor, and, or an optical demultiplexor.

3. An optical routing device as defined in claim 2 wherein said first end of said block is pivotally attached to said frame.

4. An optical routing device comprising:
   a wavelength dispersive element for separating an input beam into sub-beams of light in accordance with their wavelength;
   a waveguide block having a first end and a second end and a plurality of waveguide means disposed therein between said first end and said second end for receiving at least some of said sub-beams;
   a focusing lens disposed between the wavelength dispersive element and the first end, for focusing said sub-beams at substantially a predetermined distance from the wavelength dispersive element;
   an actuator means associated with the waveguide block for controllably moving an end of the waveguide block such as to control the alignment of the sub-beams with the plurality of waveguides at the first end of the block; and
   an imaging lens disposed between said focusing lens and said first end of said block, to compensate for an offset in the focal length of said focusing lens, wherein said imaging lens is a GRIN lens, and wherein said device is an optical multiplexor, and, or an optical demultiplexor.

5. The optical routing device as defined in claim 4 wherein said imaging lens comprises two GRIN lenses.

6. An optical routing device comprising:
   a wavelength dispersive element for separating an input beam into sub-beams of light in accordance with their wavelength;
   a waveguide block having a first end and a second end and a plurality of waveguide means disposed therein between said first end and said second end for receiving at least some of said sub-beams,
   a focusing lens disposed between the wavelength dispersive element and the first end, for focusing said sub-beams at substantially a predetermined distance from the wavelength dispersive element;
   an actuator means associated with the waveguide block for controllably moving an end of the waveguide block such as to control the alignment of the sub-beams with the plurality of waveguides at the first end of the block; and
   an imaging lens disposed between said focusing lens and said first end of said block, to compensate for an offset in the focal length of said focusing lens, wherein said imaging lens is a x:1 imaging lens where x is less than or greater than 1, and wherein said device is an optical multiplexor, and, or an optical demultiplexor.

7. An optical multiplexing/demultiplexing device comprising
   a frame, a waveguide dispersive element for separating an input beam into sub-beams of light in accordance with their wavelength;

a waveguide block having a first end and a second end and a plurality of waveguide means disposed therein between said first end and said second end for receiving at least some of said sub-beams and for receiving the input beam, said block being fastened to said frame at its first end;

a focusing lens disposed between the wavelength dispersive element and said first end of said block, for focusing said sub-beams at substantially a predetermined distance from the wavelength dispersive element;

an imaging lens having an optical axis and disposed between said focusing lens and said first end of said block to compensate for an offset in the focal length of said focusing lens, and, an actuator means mounted to said frame and coupled with said waveguide block for controllably moving said second end of said block such as to effect an angular displacement of said block with regard to an optical axis of said imaging lens and thereby to control the alignment of the sub-beams with the plurality of waveguides at the first end of said block.

8. A method of correcting for an offset in alignment in an optical routing device having a wavelength dispersive element for separating an input beam into sub-beams of light in accordance with their wavelength, a waveguide block having a first end and a second end and a plurality of waveguide means disposed in said block between said first end and said second end for receiving at least some of said sub-beams, and a focusing lens disposed between the wavelength dispersive element and the first end, for focusing said sub-beams at substantially a predetermined distance from the wavelength dispersive element, said method comprising:

providing an actuator associated with said block in a manner to effect a generally lateral displacement of said block when said actuator is activated, and controllably activating said actuator in response to said offset in alignment such as to compensate for said offset, wherein said actuator is a thermally responsive actuator.

9. A method of correcting for an offset in alignment in an optical routing device having a wavelength dispersive element for separating an input beam into sub-beams of light in accordance with their wavelength, a waveguide block having a first end and a second end and a plurality of waveguide means disposed in said block between said first end and said second end for receiving at least some of said sub-beams, and a focusing lens disposed between the wavelength dispersive element and the first end, for focusing said sub-beams at substantially a predetermined distance from the wavelength dispersive element, said method comprising:

providing an actuator associated with said block in a manner to effect a generally lateral displacement of said block when said actuator is activated, and controllably activating said actuator in response to said offset in alignment such as to compensate for said offset, wherein said displacement of said block is angular with regard to the optical axis of said focusing lens.

10. A method of correcting for an offset in alignment in an optical routing device having a wavelength dispersive element for separating an input beam into sub-beams of light in accordance with their wavelength, a waveguide block having a first end and a second end and a plurality of waveguide means disposed in said block between said first end and said second end for receiving at least some of said sub-beams, and a focusing lens disposed between the wavelength dispersive element and the first end, for focusing said sub-beams at substantially a predetermined distance from the wavelength dispersive element, said method comprising:

providing an actuator associated with said block in a manner to effect a generally lateral displacement of said block when said actuator is activated, and controllably activating said actuator in response to said offset in alignment such as to compensate for said offset, wherein said optical device further comprises an imaging lens disposed between said focusing lens and said first end of said waveguide block, said displacement being angular with respect to the optical axis of said imaging lens.

11. A method of correcting for an offset in alignment in an optical multiplexor, and, or demultiplexor device having a wavelength dispersive element for separating an input beam into sub-beams of light in accordance with their wavelength, a waveguide block having a first end and a second end and a plurality of waveguide means disposed in said block between said first end and said second end for receiving at least some of said sub-beams, and a focusing lens disposed between the wavelength dispersive element and the first end, for focusing said sub-beams at substantially a predetermined distance from the wavelength dispersive element, said method comprising:

providing an actuator associated with said block in a manner to effect a generally lateral displacement of said block when said actuator is activated, and controllably activating said actuator in response to said offset in alignment such as to compensate for said offset, wherein said actuator is responsive to changes in temperature, for effecting a generally lateral displacement of the block.

* * * * *